Patented July 12, 1949

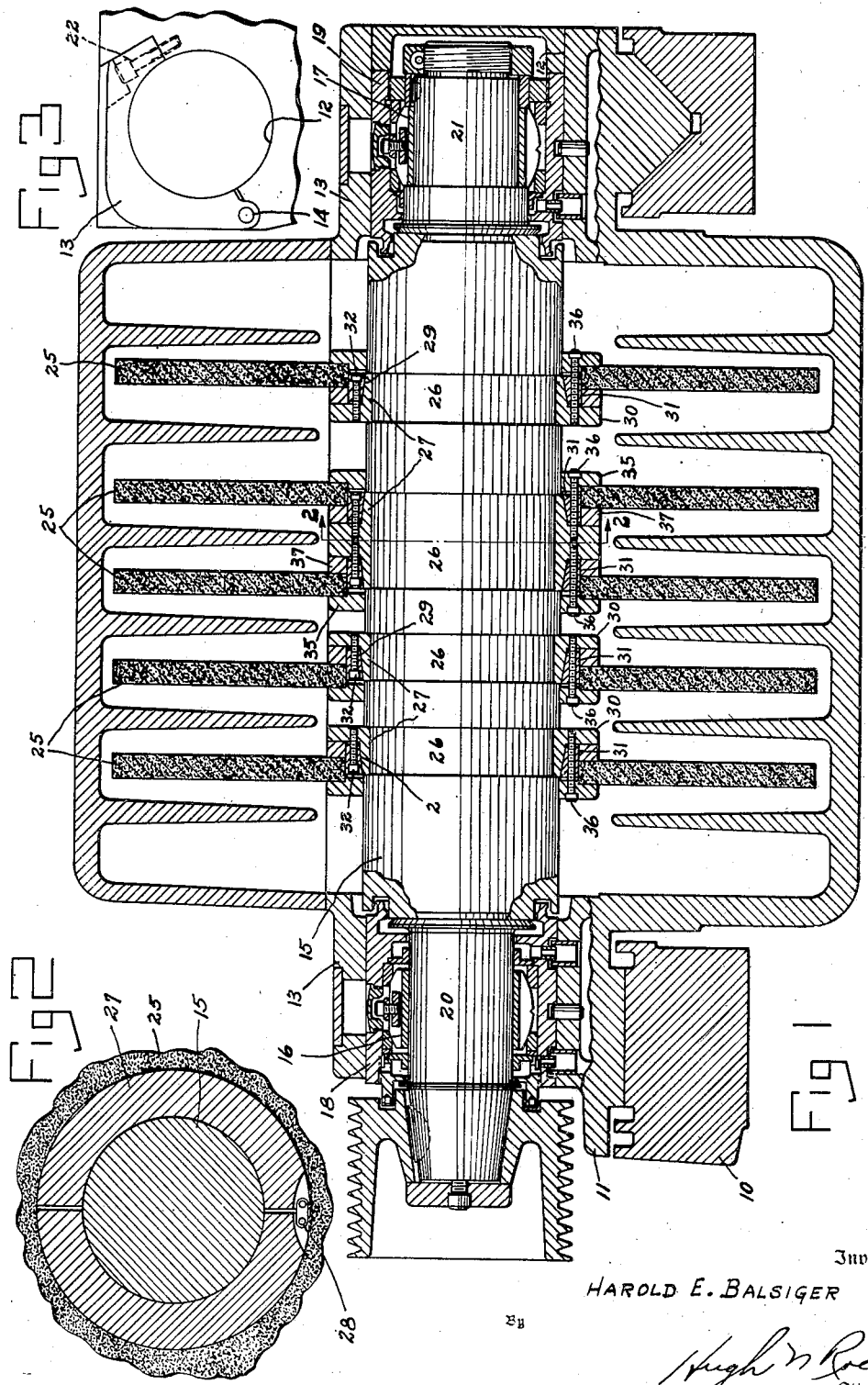

2,476,234

UNITED STATES PATENT OFFICE 2,476,234

GRINDING WHEEL MOUNTING

Harold E. Balsiger, Waynesboro, Pa., assignor to Landis Tool Company, Waynesboro, Pa.

Application August 26, 1948, Serial No. 46,335

4 Claims. (Cl. 51—168)

This invention relates to grinding machines, particularly multi-wheel machines.

In previous machines of this type, the spaced grinding wheels were mounted on a cylindrical shell which was in turn supported at opposite ends on a spindle. The shell represented an additional element to the wheel mounting with a corresponding increased cost.

It is an object of this invention to provide a multi-wheel mounting in which the wheels are mounted directly on the spindle.

A further object is to provide means whereby the wheels, spindle and bearings may be removed from the machine as a unit.

A further object is to provide means whereby the wheels may be removed from the spindle without disturbing the bearings.

In the drawings:

Figure 1 is a sectional front elevation of the spindle assembly.

Figure 2 is a partial section along the line 2—2 in Figure 1.

Figure 3 is an end view of the spindle and the portion of the wheel base in which it is mounted.

The machine base of which only the wheel base guide portions are shown is indicated by the numeral 10. Numeral 11 indicates the wheel base slidably mounted on said base.

Spindle 15 has spaced journal portions 20 and 21 of a diameter less than that of the intermediate portion thereof. Said spindle is rotatably mounted on said journals in bearings 16 and 17. Said bearings are mounted in housing members 18 and 19 respectively. Said housings are cylindrical in shape and base 11 has correspondingly spaced cylindrical seats 12 for receiving said housings. Said housings are held in place by caps 13 which may have hinges 14 at one side and be held by screws 22 at the other side or they may be completely removable.

The means for mounting grinding wheels 25 on spindle 15 consists of a series of spaced annular grooves 26. In each groove is mounted a flanged ring 27 consisting of two semi-circular members hinged at 28. The peripheral surface 29 of said ring adjacent the flange 30 is tapered. A locking ring 31 has an internal tapered surface to fit the tapered surface of ring 27. Screws 32 secure said ring to the flange 30 of ring 27 to clamp said ring securely to spindle 15.

Grinding wheels 25 are mounted on the cylindrical peripheral surface of ring 31 and secured axially against flange 30 by means of a ring 35. Screws 36 pass through rings 35 and 31 to flange 30 to hold wheel 25 in place. A spacer ring 37 is inserted between wheel 25 and flange 30. Spacer rings 37 may vary in width, depending upon the width of the wheel 25.

I claim:

1. A multiple grinding wheel mounting comprising a wheel support, spaced bearing units removably mounted in said support, a spindle having journal portions smaller in diameter than the wheel supporting portion, said wheel supporting portion having a series of spaced shallow grooves, wheel centers comprising a split ring clamped in each of said grooves and a conventional center member in each wheel having a tapered surface to engage a similar tapered surface on said split ring, the hole in said wheels being slightly larger than the diameter of said bearing unit.

2. A multiple grinding wheel mounting comprising a wheel support, spaced bearing units removably mounted in said supports, a spindle rotatably mounted in said bearings, the portion of said spindle between said bearings being of substantially the same diameter as said bearing units, spaced annular grooves in said spindle, a wheel supporting member in each groove comprising a ring having a tapered outer surface, a wheel center having a tapered inner surface for mating with that of said ring, and means for securing said centers to said ring.

3. Means for mounting a plurality of spaced grinding wheels directly on a spindle, comprising a flanged support member for each wheel, each of said flanged members being removably secured to said spindle, each grinding wheel having a center member adapted to be mounted on and secured to said flanged member.

4. A grinding wheel mounting of the type wherein a plurality of wheels is mounted on a spindle between the bearings, comprising a spindle having journal portions, smaller in diameter than the portion therebetween, bearing units for said journals comprising a bearing member, and a housing therefor, said housing having a maximum transverse dimension about the same as or less than the diameter of the intermediate portion of said spindle, a plurality of spaced wheel mounting means each including a split ring adapted to be clamped on said spindle, said ring having a tapered outer surface providing a seat for receiving a correspondingly tapered grinding wheel center.

HAROLD E. BALSIGER.

No references cited.